United States Patent
Harel et al.

(10) Patent No.: US 11,423,010 B2
(45) Date of Patent: Aug. 23, 2022

(54) SYSTEM AND METHOD FOR INVALIDATING MULTI-LEVEL HASH TABLE BUCKETS

(71) Applicant: EMC IP Holding Company, LLC, Hopkinton, MA (US)

(72) Inventors: Bar Harel, Tel Aviv (IL); Bar David, Rishon Lezion (IL); Uri Shabi, Tel Mond (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 120 days.

(21) Appl. No.: 17/074,803

(22) Filed: Oct. 20, 2020

(65) Prior Publication Data

US 2022/0121646 A1    Apr. 21, 2022

(51) Int. Cl.
| G06F 16/00 | (2019.01) |
| G06F 16/23 | (2019.01) |
| G06F 16/22 | (2019.01) |
| G06F 16/28 | (2019.01) |
| G06F 21/64 | (2013.01) |
| G06Q 10/10 | (2012.01) |

(52) U.S. Cl.
CPC ...... *G06F 16/2365* (2019.01); *G06F 16/2255* (2019.01); *G06F 16/285* (2019.01); *G06F 21/64* (2013.01); *G06Q 10/10* (2013.01)

(58) Field of Classification Search
None
See application file for complete search history.

(56) References Cited

U.S. PATENT DOCUMENTS

| 9,779,015 | B1* | 10/2017 | Oikarinen | G06F 3/067 |
| 2020/0167327 | A1* | 5/2020 | Breslow | G06F 16/9014 |
| 2020/0242095 | A1* | 7/2020 | Malik | G06F 16/245 |
| 2021/0182262 | A1* | 6/2021 | Jayasena | G06F 16/2255 |
| 2021/0365458 | A1* | 11/2021 | Slavitch | G06F 9/30029 |

\* cited by examiner

*Primary Examiner* — Anhtai V Tran
(74) *Attorney, Agent, or Firm* — Brian J. Colandreo; Mark H. Whittenberger; Holland & Knight LLP

(57) ABSTRACT

A method, computer program product, and computing system for storing data in one or more buckets of a plurality of buckets in a first level. The data of the one or more buckets may be de-staged to a plurality of buckets in a second level. The one or more buckets may be invalidated in the first level. A range of valid buckets in the first level may be defined based upon, at least in part, invalidating the one or more buckets in the first level.

20 Claims, 4 Drawing Sheets

SYSTEM AND METHOD FOR INVALIDATING MULTI-LEVEL HASH TABLE BUCKETS

BACKGROUND

Storing and safeguarding electronic content may be beneficial in modern business and elsewhere. Accordingly, various methodologies may be employed to protect and distribute such electronic content.

In some implementations, hardening of a bucket from one level to another level of a multi-level non-volatile hash table may result in entries of the bucket being removed or invalidating the bucket. In some implementations, removing entries of bucket may cripple amortization as it will introduce an additional write of an empty bucket and may not allow hardening of buckets of the same domain or level in a sequential manner.

Accordingly, conventional approaches have attempted to invalidate buckets in response to hardening a bucket from one level to another. However, these approaches generally include maintaining a persistent bitmap on non-volatile storage, where there will be a bit per bucket indicating whether the bucket is valid which may require extensive amounts of memory.

SUMMARY OF DISCLOSURE

In one example implementation, a computer-implemented method executed on a computing device may include, but is not limited to, storing data in one or more buckets of a plurality of buckets in a first level. The data of the one or more buckets may be de-staged to a plurality of buckets in a second level. The one or more buckets may be invalidated in the first level. A range of valid buckets in the first level may be defined based upon, at least in part, invalidating the one or more buckets in the first level.

One or more of the following example features may be included. Each of the first level and the second level may be levels of a non-volatile hash table. De-staging the data of the bucket to the plurality of buckets in the second level may include determining that the one or more buckets of the plurality of buckets in the first level have at least a threshold amount of data. Invalidating the one or more buckets of the first level may include invalidating the one or more buckets of the first level in a consecutive-cyclic manner. The range of valid buckets in the first level may be stored within a metadata page of the first level. A range of valid buckets in the second level may be defined based upon, at least in part, de-staging the data of the one or more buckets to the plurality of buckets in the second level. The range of valid buckets in the second level may be stored within a metadata page of the second level.

In another example implementation, a computer program product resides on a computer readable medium that has a plurality of instructions stored on it. When executed by a processor, the instructions cause the processor to perform operations that may include, but are not limited to, storing data in one or more buckets of a plurality of buckets in a first level. The data of the one or more buckets may be de-staged to a plurality of buckets in a second level. The one or more buckets may be invalidated in the first level. A range of valid buckets in the first level may be defined based upon, at least in part, invalidating the one or more buckets in the first level.

One or more of the following example features may be included. Each of the first level and the second level may be levels of a non-volatile hash table. De-staging the data of the bucket to the plurality of buckets in the second level may include determining that the one or more buckets of the plurality of buckets in the first level have at least a threshold amount of data. Invalidating the one or more buckets of the first level may include invalidating the one or more buckets of the first level in a consecutive-cyclic manner. The range of valid buckets in the first level may be stored within a metadata page of the first level. A range of valid buckets in the second level may be defined based upon, at least in part, de-staging the data of the one or more buckets to the plurality of buckets in the second level. The range of valid buckets in the second level may be stored within a metadata page of the second level.

In another example implementation, a computing system includes at least one processor and at least one memory architecture coupled with the at least one processor, wherein the at least one processor may be configured to store data in one or more buckets of a plurality of buckets in a first level, wherein the at least one processor may be further configured to de-stage the data of the one or more buckets to a plurality of buckets in a second level, wherein the at least one processor may be further configured to invalidate the one or more buckets in the first level, and wherein the at least one processor may be further configured to define a range of valid buckets in the first level based upon, at least in part, invalidating the one or more buckets in the first level.

One or more of the following example features may be included. Each of the first level and the second level may be levels of a non-volatile hash table. De-staging the data of the bucket to the plurality of buckets in the second level may include determining that the one or more buckets of the plurality of buckets in the first level have at least a threshold amount of data. Invalidating the one or more buckets of the first level may include invalidating the one or more buckets of the first level in a consecutive-cyclic manner. The range of valid buckets in the first level may be stored within a metadata page of the first level. A range of valid buckets in the second level may be defined based upon, at least in part, de-staging the data of the one or more buckets to the plurality of buckets in the second level. The range of valid buckets in the second level may be stored within a metadata page of the second level.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Figure 1:
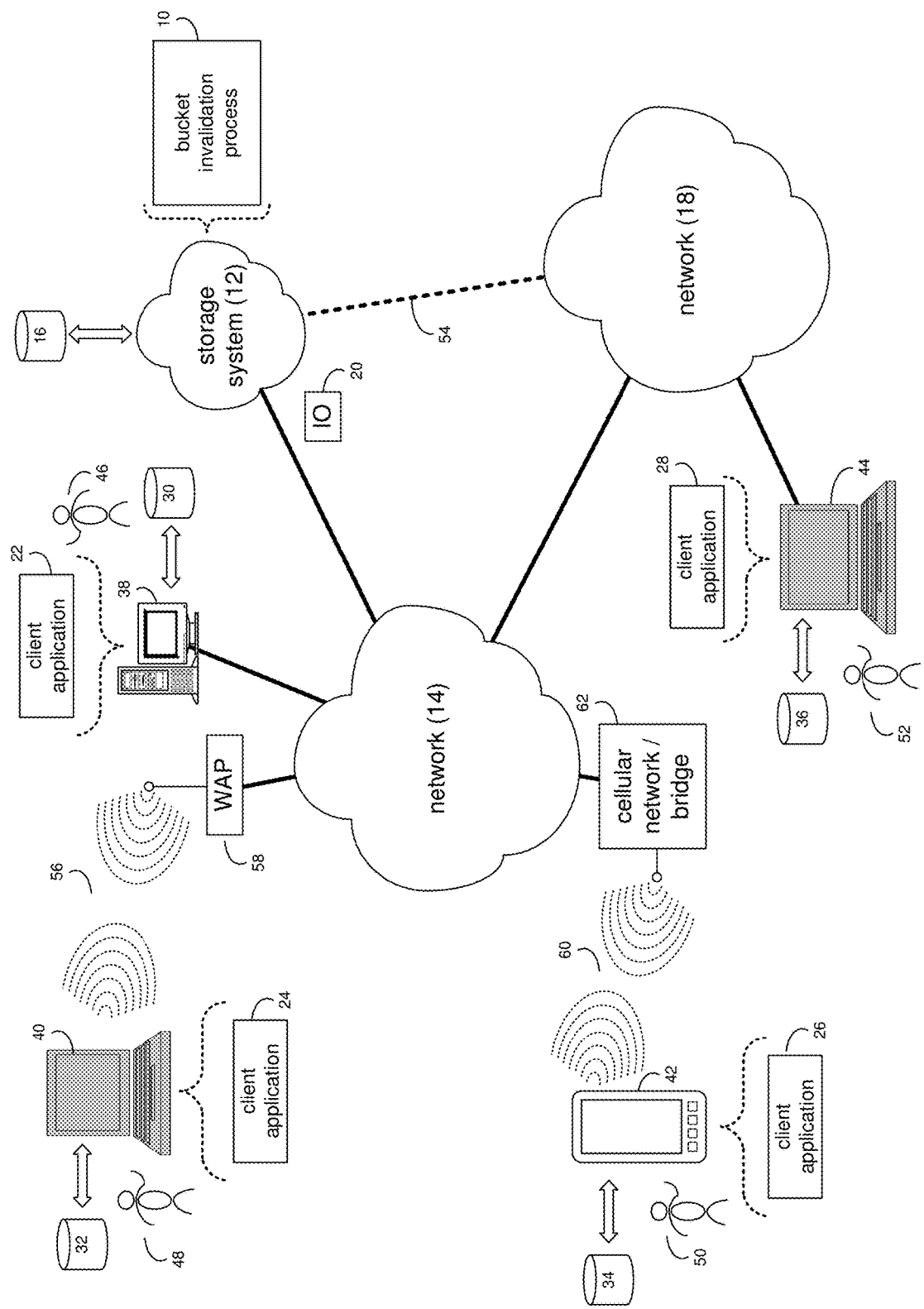
FIG. 1 is an example diagrammatic view of a storage system and a bucket invalidation process coupled to a distributed computing network according to one or more example implementations of the disclosure.

System Overview:

Referring to FIG. 1, there is shown bucket invalidation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of bucket invalidation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of bucket invalidation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a bucket invalidation process, such as bucket invalidation process 10 of FIG. 1, may include but is not limited to, storing data in one or more buckets of a plurality of buckets in a first level. The data of the one or more buckets may be de-staged to a plurality of buckets in a second level. The one or more buckets may be invalidated in the first level. A range of valid buckets in the first level may be defined based upon, at least in part, invalidating the one or more buckets in the first level.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
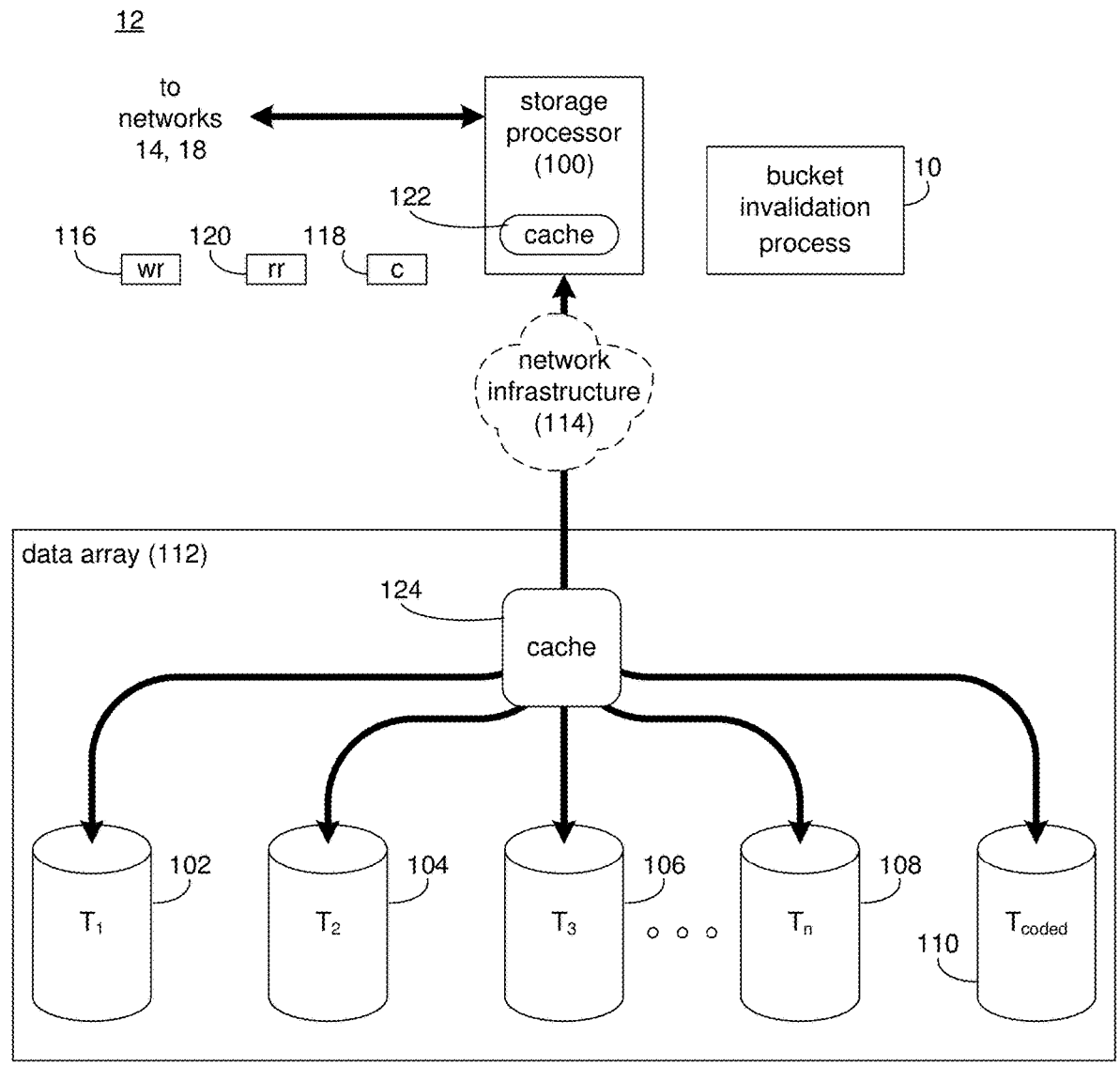
FIG. 2 is an example diagrammatic view of the storage system of FIG. 1 according to one or more example implementations of the disclosure.

The Storage System:

Referring also to FIG. 2, storage system 12 may include one or more storage processors (e.g., storage processor 100) and a plurality of storage targets T1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of bucket invalidation process 10. The instruction sets and subroutines of bucket invalidation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of bucket invalidation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system), a non-volatile, solid-state, cache memory system (e.g., a flash-based, cache memory system), an L1 cache, and/or an L2 cache.

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of bucket invalidation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of bucket invalidation process 10 may be executed by one or more processors (not shown) and one or more memory architectures (not shown) included within data array 112.

Figure 3:
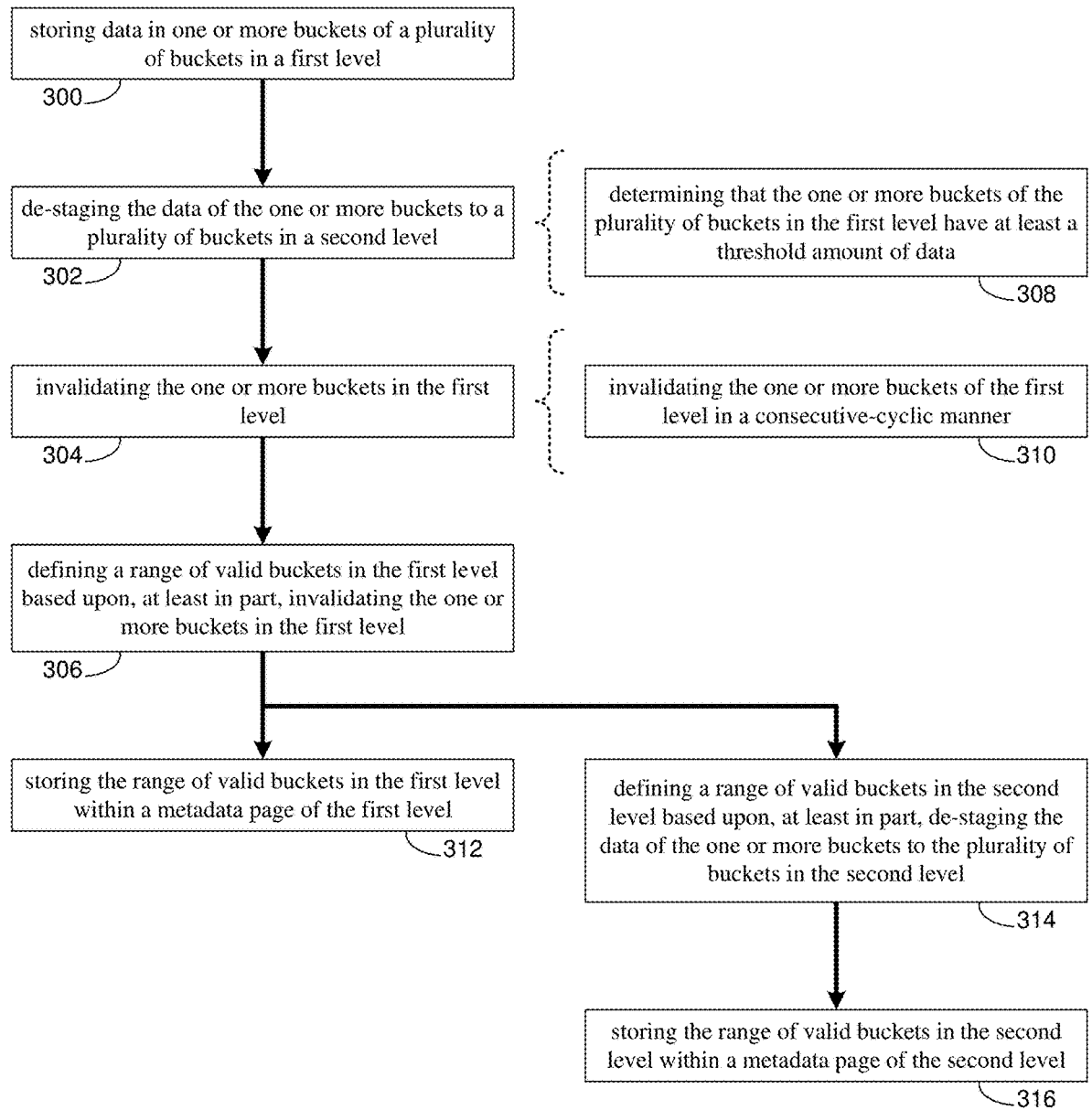
FIG. 3 is an example flowchart of bucket invalidation process according to one or more example implementations of the disclosure.
Figure 4:
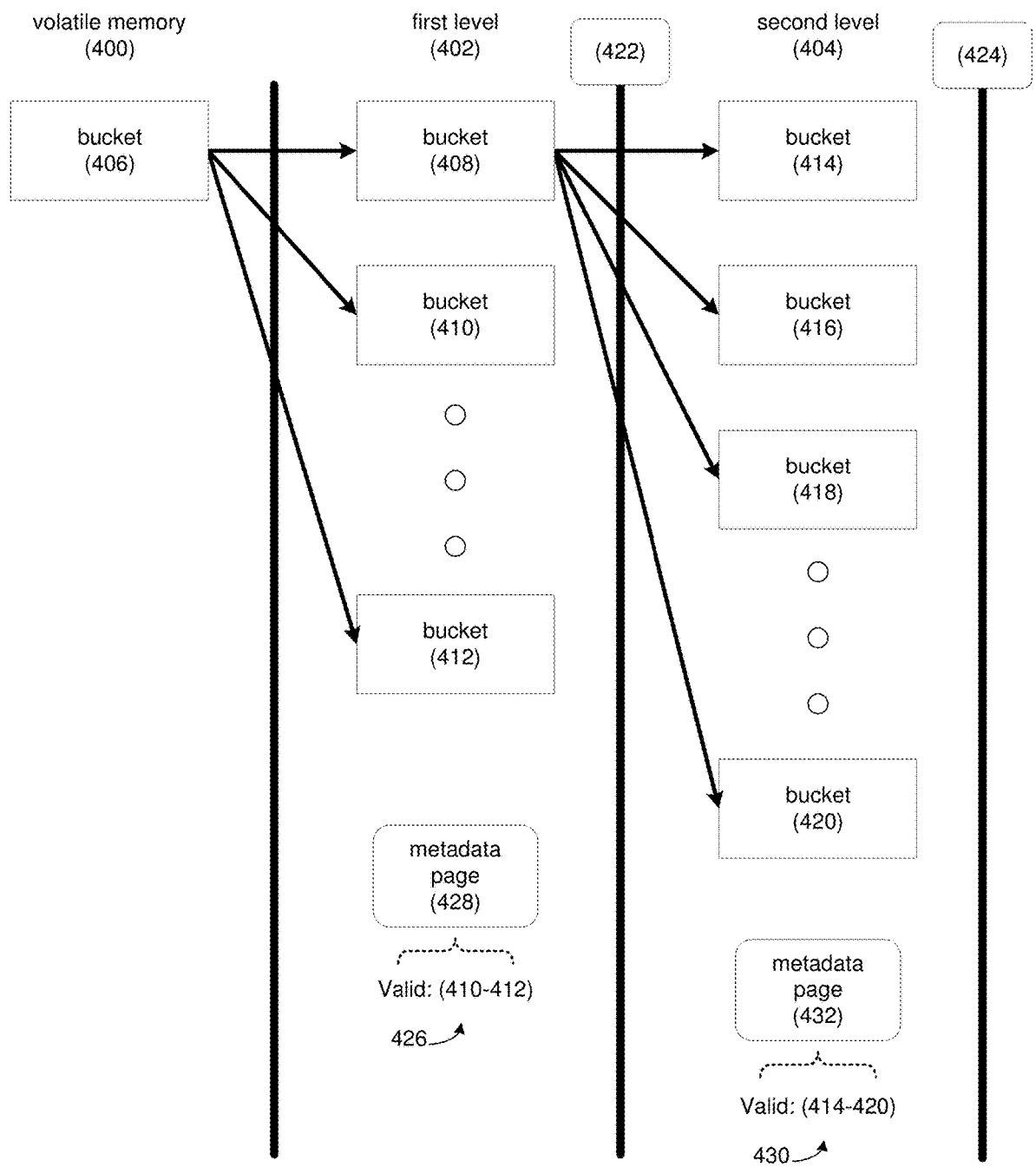
FIG. 4 is an example diagrammatic view of the storage system of FIG. 1 according to one or more example implementations of the disclosure.
}

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).
The Bucket Invalidation Process:

Referring also to the examples of FIGS. 3-4 and in some implementations, bucket invalidation process 10 may store 300 data in one or more buckets of a plurality of buckets in a first level. The data of the one or more buckets may be de-staged 302 to a plurality of buckets in a second level. The one or more buckets may be invalidated 304 in the first level. A range of valid buckets in the first level may be defined 306 based upon, at least in part, invalidating the one or more buckets in the first level.

As will be discussed in greater detail below, implementations of the present disclosure may allow a metadata-efficient process for invalidating buckets on a non-volatile hash table level after they are "hardened" to another hardening level. As is known in the art, hardening data may generally include saving data from a volatile memory into one or more levels of non-volatile memory and/or hardening data from one level of a non-volatile memory into another layer of the non-volatile memory. A hash table may generally include a data structure which implements an associative array abstract data type, a structure that may map keys to values. It uses a hash function to compute from a given key an index into an array of buckets, from which the desired value may be found. A basic requirement is that the hash function should provide a uniform distribution of hash values over the table size. In some implementations, hash collisions (i.e., where the hash function generates the same index for more than one key) may be resolved by chaining entries with the same bucket. A fixed size hash table may be a table with a fixed number of buckets (N), each one of a fixed maximal number of entries (M). For example, a hash table may include e.g., 1,000,000 buckets, each with a maximum of 256 entries rounded to the closest native block size, e.g., 4 kilobyte (KB).

In some implementations, multiple levels upon non-volatile memory may be used to aggregate hash table entries and improve amortization upon hardening. In some implementations, persistent media may be divided into one or more hash table levels of increasing size. As will be discussed in greater detail below and in some implementations, once a hash table bucket reaches a threshold of fullness, it may be hardened or de-staged to the next hash table level. In some implementations, this can improve amortization and, in some cases, make the hardening process feasible.

For example, suppose storage system 12 includes e.g., 1 gigabyte (GB) hash table in memory (e.g., a volatile memory) and e.g., 272 GB space on persistent media for a hardened hash table. Further suppose that each page size is e.g., 4 KB, the bucket size is 4 KB, and each bucket can store e.g., 200 hash entries (for both volatile and non-volatile hash tables). In this example, if bucket invalidation process 10 were to harden or de-stage a volatile bucket once it is completely full, it would mean that bucket invalidation process 10 would persist 200 entries. Since the next level (e.g., the 272 GM space on persistent media) is 272 times bigger than the volatile hash table, this will require 272 disk writes, which will mean the amortization will be $$\frac{200}{272},$$

which will result in intolerable amortization.

Referring also to the example of FIG. 4 and in some implementations, suppose a storage system (e.g., storage system 12) includes a volatile memory (e.g., volatile memory 400) and a plurality of levels of non-volatile memory (e.g., first layer 402 of non-volatile memory and second layer 404 of non-volatile memory). Suppose, for example purposes only, that first level 402 or "L2" has a storage capacity of e.g., 16 GB and that second level 404 or "L3" has a storage capacity of e.g., 256 GB. As will be discussed in greater detail below, bucket invalidation process 10 may harden or de-stage buckets of first level 402 onto second level 404.

In some implementations, if bucket invalidation process 10 hardens or de-stages a volatile bucket (e.g., bucket 406) of volatile memory 400 once it is completely full, bucket invalidation process 10 may persist 200 entries. Since the next level (e.g., first level 402 on persistent media) is 16 times bigger than the volatile hash table, hardening a 200-entry-bucket (e.g., bucket 406) onto a plurality of buckets (e.g., buckets 408, 410, 412) of first level 402 may require 16 disk writes, which may result in amortization of $$\frac{200}{16}.$$

For similar reasons, amortization for hardening a bucket (e.g., bucket 408) of first level 402 to a plurality of buckets (e.g., buckets 414, 416, 418) may be $$\frac{200}{16}$$

as well.

In some implementations, bucket invalidation process 10 may store a hash entry on a bucket using bucket bits of the hash used as key in the hash table, and for each level, increasing the number of bits used to determine the bucket. Referring again to FIG. 4 and the above example where a 1 GB hash table is stored in volatile memory (e.g., volatile memory 400) and the non-volatile memory includes a first level (e.g., first level 402) with a 16 GB storage capacity and a second level (e.g., second level 404) with a 256 GB storage capacity. Further suppose that each bucket has a storage capacity of 4 KB. In this example, there may be $$\frac{2^{40}}{2^{12}} = 2^{28}$$

buckets in volatile memory 400, and that 28 bits of the hash may determine the bucket in memory where entries may be stored. Additionally, first level 402 may include $2^{32}$ buckets, and may use the same 28 bits as the hash table in volatile memory 400 with an additional 4 bits of the collision bits.

Further, second level 404 may include $2^{36}$ buckets, and may use the same 32 bits as first level 402 with an additional 4 bits of the collision bits.

In some implementations, hardening of a bucket from one level to another may result in the entries of the bucket being removed or that the bucket is invalidated. In some implementations, removing entries of bucket may cripple amortization as it will introduce an additional write of an empty bucket and may not allow hardening of buckets of the same domain or level in a sequential manner.

Accordingly, conventional approaches have attempted to invalidate buckets in response to hardening a bucket from one level to another. However, these approaches generally include maintaining a persistent bitmap on non-volatile storage, where there will be a bit per bucket indicating whether the bucket is valid which may require extensive amounts of memory. For example and as discussed above, maintaining a bitmap for a first level of non-volatile memory with a storage capacity of e.g. 16 GB may require $2^{32}$ bits as the first level of non-volatile memory may include $2^{32}$ buckets. As such, these bitmaps configured to track bucket validity may impractical and computationally expensive to generate and maintain. As will be discussed in greater detail below, bucket invalidation process 10 may define a range of valid or invalid buckets for a level of the non-volatile hash table using two unsigned integers. Accordingly, bucket invalidation process 10 may provide significant memory savings in a storage system when invalidating buckets after hardening or de-staging the buckets to the next hardening level.

In some implementations, bucket invalidation process 10 may store 300 data in one or more buckets of a plurality of buckets in a first level. Referring again to FIG. 4 and in some implementations, bucket invalidation process 10 may store 300 data (e.g., from volatile bucket 406 of volatile memory 400) in one or more buckets (e.g., bucket 408) of a plurality of buckets in a first level (e.g., first level 402). In some implementations, bucket invalidation process 10 may continuously store 300 data in the plurality of buckets in the first level. For example and as described above, each bucket (e.g., bucket 408) may have a predefined storage size (e.g., 4 KB). While the example of FIG. 4 shows data being de-staged from volatile bucket 406 of volatile memory 400 to bucket 408, it will be appreciated that bucket invalidation process 10 may store 300 data in bucket 408 by de-staging data from a lower level. In this manner, first level 402 may not be a "first" level of non-volatile memory of a non-volatile hash table.

In some implementations, each of the first level and the second level may be levels of a non-volatile hash table. As discussed above and in some implementations, bucket invalidation process 10 may utilize volatile memory to be used as a level of caching and amortization for a hash table, which may be hardened to a non-volatile memory block device. In some implementations, multiple levels upon non-volatile memory may be used to aggregate hash table entries and improve amortization upon hardening.

In some implementations, bucket invalidation process 10 may de-stage 302 the data of the one or more buckets to a plurality of buckets in a second level. For example, bucket invalidation process 10 may use each level of a non-volatile memory to cache and/or amortize a hash table. De-staging 302 or hardening the data of the one or more buckets to a plurality of buckets may generally include the storing of data of one bucket in a plurality of buckets of a next or larger layer of non-volatile memory. In this manner, entries of a hash table may be amortized.

In some implementations, de-staging 302 the data of the one or more buckets to the plurality of buckets in the second level may include determining 308 that the one or more buckets of the plurality of buckets in the first level have at least a threshold amount of data. For example, once a bucket reaches a threshold of fullness, bucket invalidation process 10 may de-stage 302 or harden the bucket to the next hash table level. In some implementations, the threshold amount of data used to determine when to de-stage data from a bucket may be user-defined (e.g., via a user interface) and/or may be defined automatically by bucket invalidation process 10. In some implementations, the threshold amount of memory may include a percentage or ratio of used space versus free space and/or an amount of memory. For example, suppose a bucket has a total storage capacity of e.g., 4 KB. In one example, the threshold amount of data to trigger or initiate de-staging may be e.g., 80%. Accordingly, when e.g., 80% of a bucket is full, bucket invalidation process 10 may de-stage 302 the bucket to the next level. While examples have been provided of various thresholds, it will be appreciated that any threshold amount of data to determine when to de-stage data from a bucket may be used within the scope of the present disclosure.

Referring again to the example of FIG. 4 and in some implementations, suppose bucket invalidation process 10 determines 308 that bucket 408 includes at least a threshold amount of data defined for the plurality of buckets of first level 402. In this example, bucket invalidation process 10 may de-stage 302 the data of bucket 408 to a plurality of buckets of second level 404. In the example of FIG. 4, bucket invalidation process 10 may de-stage 302 the data of bucket 408 to buckets 414, 416, 418, and 420.

In some implementations, bucket invalidation process 10 may invalidate 304 the one or more buckets in the first level. In some implementations, when hash table buckets are de-staged 302 or hardened to the next hardening level, bucket invalidation process 10 may invalidate 304 the de-staged buckets to clear space for new entries. Referring again to the example of FIG. 4 and in some implementations, bucket invalidation process 10 may invalidate 304 bucket 408 in response to de-staging the data of bucket 408 to buckets 414, 416, 418, and 420 of second level 404. In this manner, as bucket 408 is invalidated, the data of bucket 408 may not be used when processing subsequent read commands. Rather, bucket invalidation process 10 may read the data from one or more of buckets 414, 416, 418, and 420.

In some implementations, invalidating 304 the one or more buckets of the first level may include invalidating 310 the one or more buckets of the first level in a consecutive-cyclic manner. For example, the invalid buckets of a particular level of non-volatile memory may be invalidated 310 sequentially in a cyclic manner. In some implementations, a de-stager may be configured to write or store data from one bucket of one level to another bucket of another level in a sequential manner. Referring again to the example of FIG. 4 and in some implementations, a de-stager (e.g., de-stager 422) may de-stage 302 one or more buckets from first level 402 to a plurality of buckets in second level 404 sequentially and de-stager 424 may de-stage one or more buckets from second level 404 to a next level. In some implementations, de-stager 422 may work more quickly than de-stager 424 because the buckets from first level 402 may fill much faster than the buckets of the second level 404.

In some implementations, bucket invalidation process 10 may define 306 a range of valid buckets in the first level based upon, at least in part, invalidating the one or more buckets in the first level. For example, because the buckets of a particular level of non-volatile memory may be invalidated sequentially in a cyclic manner, bucket invalidation process 10 may define 306 a range of valid/invalid buckets as a sequential cyclic range. In some implementations, process may define 306 a range of valid buckets using two unsigned integers. Referring again to the example of FIG. 4, suppose that bucket invalidation process 10 invalidates 304 bucket 408 in response to de-staging 302 the data of bucket 408 to a plurality of buckets of second level 404. In this example, bucket invalidation process 10 may define 306 a range of valid buckets for first level 402. For example, bucket invalidation process 10 may define 306 the range of buckets 410-412 as valid (e.g., range of valid buckets 426) because bucket 408 is invalid and buckets 410-412 have yet to be invalidated.

In some implementations, bucket invalidation process 10 may define a range of valid buckets for each level of the non-volatile hash table. For example, each range of valid buckets may be defined individually and may be independent per level or domain.

In some implementations, bucket invalidation process 10 may store 312 the range of valid buckets in the first level within a metadata page of the first level. For example, bucket invalidation process 10 may store 312 the valid range of buckets on persistent media on a metadata page per domain or level. In some implementations, bucket invalidation process 10 may store 312 the range of valid buckets on top of the metadata page per domain or level that already exists to store the 'head' and 'spare' of each domain or level. Referring again to the example of FIG. 4 and in some implementations, bucket invalidation process 10 may store 312 range of valid buckets 426 to metadata page 428 of first level 402.

In some implementations, bucket invalidation process 10 may define 314 a range of valid buckets in the second level based upon, at least in part, de-staging 302 the data of the one or more buckets to the plurality of buckets in the second level. For example and as discussed above, bucket invalidation process 10 may define a range of valid buckets for one level of the non-volatile hash table independently of any other level of the non-volatile hash table. In some implementations, de-staging 302 the data of the one or more buckets of the first level to the plurality of buckets of the second level may include writing new buckets in the second level. For example, when de-staging 302 the data of buckets from one level to the buckets of another level, bucket invalidation process 10 may write new buckets. These newly-written buckets may be valid. In another example, bucket invalidation process 10 may de-stage data to previously invalidated buckets (e.g., buckets that were previously de-staged to the next level). Accordingly, bucket invalidation process 10 may define 314 a range of valid buckets in the second level.

Referring again to the example of FIG. 4, suppose that bucket invalidation process 10 de-stages 302 the data of bucket 408 to buckets 414, 416, 418, and 420 of second level 404. Further suppose that previous to de-staging 302 the data of bucket 408 to the second level, buckets 414-420 were invalidated buckets. In this example, bucket invalidation process 10 may define 314 a range of valid buckets for second level 402. For example, bucket invalidation process 10 may define 314 the range of buckets 414-420 as valid (e.g., range of valid buckets 430) because buckets 414, 416, 418, and 420 include data de-staged from bucket 408.

In some implementations, bucket invalidation process 10 may store 316 the range of valid buckets in the second level within a metadata page of the second level. Referring again to the example of FIG. 4 and in some implementations, bucket invalidation process 10 may store 316 range of valid buckets 430 to metadata page 432 of first level 404.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    storing data in one or more buckets of a plurality of buckets in a first level;
    de-staging the data of the one or more buckets to a plurality of buckets in a second level;
    invalidating the one or more buckets in the first level; and
    defining a range of valid buckets in the first level based upon, at least in part, invalidating the one or more buckets in the first level.

2. The computer-implemented method of claim 1, wherein each of the first level and the second level are levels of a non-volatile hash table.

3. The computer-implemented method of claim 1, wherein de-staging the data of the bucket to the plurality of buckets in the second level includes:
    determining that the one or more buckets of the plurality of buckets in the first level have at least a threshold amount of data.

4. The computer-implemented method of claim 1, wherein invalidating the one or more buckets of the first level includes:
    invalidating the one or more buckets of the first level in a consecutive-cyclic manner.

5. The computer-implemented method of claim 1, further comprising:
    storing the range of valid buckets in the first level within a metadata page of the first level.

6. The computer-implemented method of claim 1, further comprising:
    defining a range of valid buckets in the second level based upon, at least in part, de-staging the data of the one or more buckets to the plurality of buckets in the second level.

7. The computer-implemented method of claim 6, further comprising:
    storing the range of valid buckets in the second level within a metadata page of the second level.

8. A computer program product residing on a non-transitory computer readable medium having a plurality of instructions stored thereon which, when executed by a processor, cause the processor to perform operations comprising:
    storing data in one or more buckets of a plurality of buckets in a first level;
    de-staging the data of the one or more buckets to a plurality of buckets in a second level;
    invalidating the one or more buckets in the first level; and
    defining a range of valid buckets in the first level based upon, at least in part, invalidating the one or more buckets in the first level.

9. The computer program product of claim 8, wherein each of the first level and the second level are levels of a non-volatile hash table.

10. The computer program product of claim 8, wherein de-staging the data of the bucket to the plurality of buckets in the second level includes:
   determining that the one or more buckets of the plurality of buckets in the first level have at least a threshold amount of data.

11. The computer program product of claim 8, wherein invalidating the one or more buckets of the first level includes:
   invalidating the one or more buckets of the first level in a consecutive-cyclic manner.

12. The computer program product of claim 8, wherein the operations further comprise:
   storing the range of valid buckets in the first level within a metadata page of the first level.

13. The computer program product of claim 8, wherein the operations further comprise:
   defining a range of valid buckets in the second level based upon, at least in part, de-staging the data of the one or more buckets to the plurality of buckets in the second level.

14. The computer program product of claim 13, wherein the operations further comprise:
   storing the range of valid buckets in the second level within a metadata page of the second level.

15. A computing system comprising:
   a memory; and
   a processor configured to store data in one or more buckets of a plurality of buckets in a first level, wherein the processor is further configured to de-stage the data of the one or more buckets to a plurality of buckets in a second level, wherein the processor is further configured to invalidate the one or more buckets in the first level, and wherein the processor is further configured to define a range of valid buckets in the first level based upon, at least in part, invalidating the one or more buckets in the first level.

16. The computing system of claim 15, wherein each of the first level and the second level are levels of a non-volatile hash table.

17. The computing system of claim 15, wherein de-staging the data of the bucket to the plurality of buckets in the second level includes:
   determining that the one or more buckets of the plurality of buckets in the first level have at least a threshold amount of data.

18. The computing system of claim 15, wherein invalidating the one or more buckets of the first level includes:
   invalidating the one or more buckets of the first level in a consecutive-cyclic manner.

19. The computing system of claim 15, wherein the processor is further configured to:
   store the range of valid buckets in the first level within a metadata page of the first level.

20. The computing system of claim 15, wherein the processor is further configured to:
   define a range of valid buckets in the second level based upon, at least in part, de-staging the data of the one or more buckets to the plurality of buckets in the second level.

* * * * *